Figure 1:
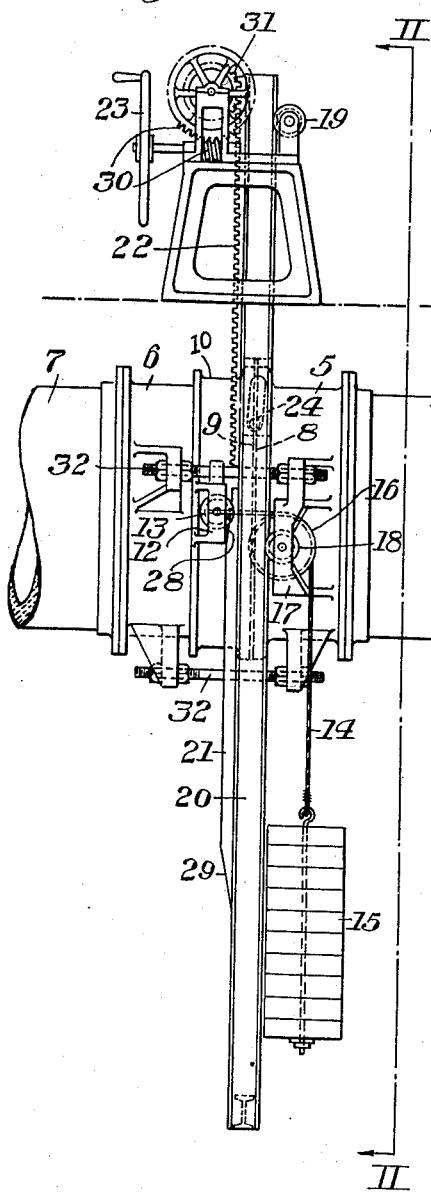

Oct. 14, 1930.  G. L. FISK  1,778,070
VALVE AND METHOD OF OPERATING SAME
Filed Feb. 11, 1927  2 Sheets-Sheet 1

INVENTOR
Gustaf L. Fisk
By Archworth Martin,
Attorney.

Oct. 14, 1930.  G. L. FISK  1,778,070
VALVE AND METHOD OF OPERATING SAME
Filed Feb. 11, 1927  2 Sheets-Sheet 2
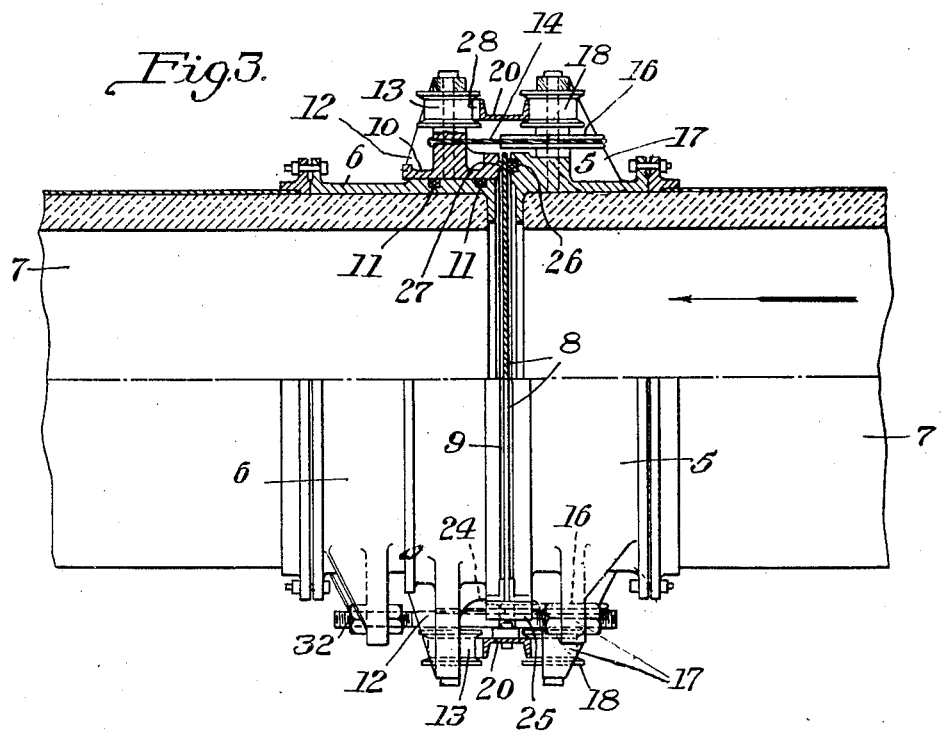
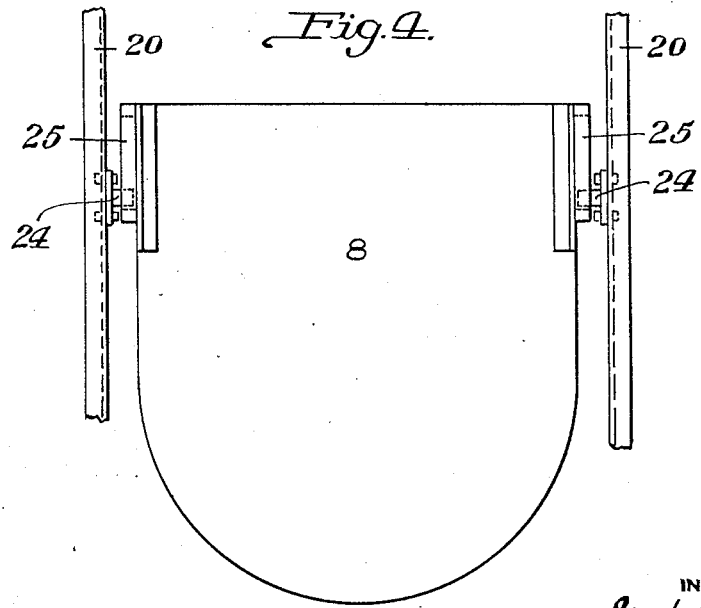
INVENTOR
Gustaf L. Fisk
By Archworth Martin,
Attorney Patented Oct. 14, 1930

1,778,070

UNITED STATES PATENT OFFICE

GUSTAF L. FISK, OF MIDLAND, PENNSYLVANIA

VALVE AND METHOD OF OPERATING SAME

Application filed February 11, 1927. Serial No. 167,447.

My invention relates to a method of and apparatus for controlling the flow of fluids, in gas mains or other conduits.

A particular and preferred application of my invention is to pipes employed in delivering gaseous fuel to furnaces.

The ordinary gas shut-off valves now in use necessitate right-angle turns in the conduit within the gas piping wherein the valve is placed, or dampers are pushed into the gas pipe and backed by sand or loam against the valve seats. In the former case, it is customary to use a mushroom-shaped valve, and to prevent leakage of gas past the valve by use of loam. The right-angle turns in the gas piping add to the cost of the piping, require space, and cause resistance to the flow of the gas. Furthermore, in the case of mushroom valves, there is chance for leakage, which may be dangerous to men working in the flues or furnaces beyond the shut-off valve. The use of sand dampers is cumbersome, and considerable time is required to shut off or turn on the gas in this manner.

Later types of shut-off valves have a slide damper which is inserted into or withdrawn from a slot provided in the pipe for the purpose; by which operation the gas is turned off or on. The closing of the slit, with the damper inserted or withdrawn, is accomplished by power applied to a rigid driving mechanism or by utilizing the phenomena of expansion and contraction of bodies by changing their temperature. The objection to these two methods of closing the slot is the uncertainty of the closing power which may be so great as to jam or distort the operating mechanism, thereby preventing easy or reliable operation of the valve.

My invention is shown as embodied in a structure which includes a damper or gate valve that is inserted into or withdrawn from a conduit, through a slot, by a rig that may be operated by mechanical power or manually, as desired, so as to effect a complete shut-off of gas, without the use of loam or sand. The closing of the slot, with the damper inserted or withdrawn, is accomplished by means of counterweights which exert a constant working force at all times. Furthermore, to facilitate the operation of the valve the damper is caused to clear its seat prior to raising it out of the pipe. The closing or the opening of the gas main is accomplished in a few seconds by a single operation.

My invention has for its objects the provision of a means and a method whereby the various objections present in the older types of apparatus above enumerated are overcome, and wherein the various advantages above referred to are secured, and to simplify and improve generally the structure and operation of valve apparatus.

Figure 2:
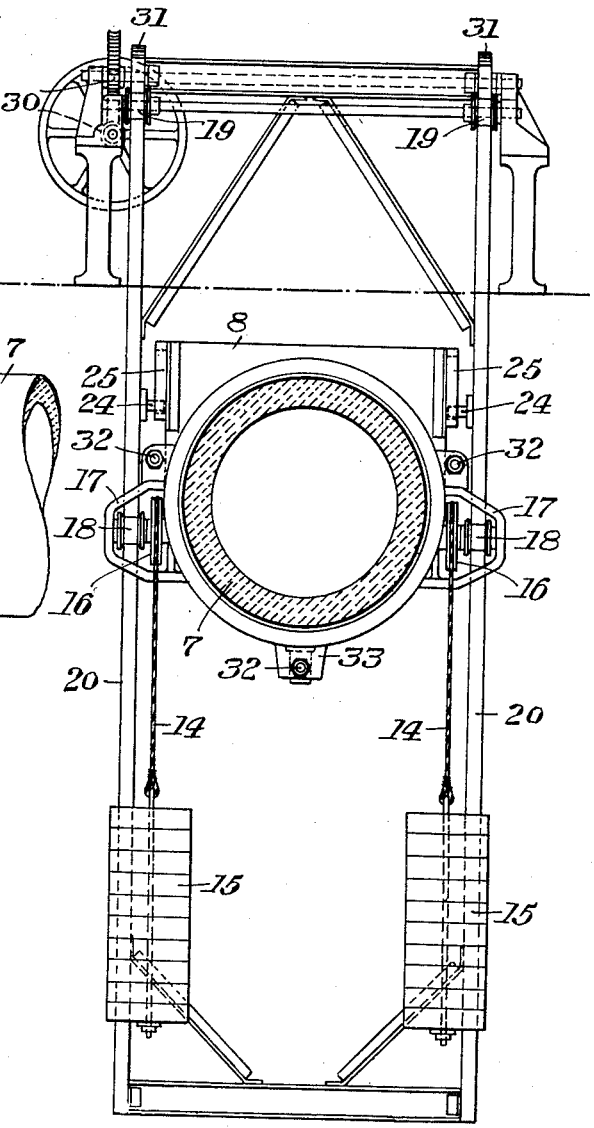

In the accompanying drawings, Figure 1 is a side elevational view of my valve applied to a gas pipe, and provided with a means for manual operation thereof; Fig. 2 is a cross sectional view taken on the line II—II of Fig. 1; Fig. 3 is a view of a portion of the structure of Fig. 1, partially in plan and partially in section, but on an enlarged scale, and Fig. 4 is an enlarged elevational view of a portion of the apparatus of Fig. 2, showing the valve or damper and a portion of the operating mechanism therefor.

As shown in the drawing, the structure includes two short, preferably brick-lined, pipe sections 5 and 6, inserted into, and forming part of the gas line 7, and a damper or gate valve 8 which is movable in and out of the line, through a slot 9, between the pipe sections 5 and 6. This slot may be opened or closed around the circumference of the pipe sections 5 and 6, by means of valve ring 10 that is slidably mounted on the pipe section 6. The valve ring 10 is sufficiently removed from the flow of the gas to prevent its being overheated and warped; and leakage between it and the pipe section 6 is prevented by packing 11, of asbestos rope or other suitable material. The valve ring 10 carries two diametrically placed brackets 12, which carry rollers 13, and to which brackets are attached wire ropes 14, which in turn, by aid of counterweights 15 tend to pull valve ring 10 into closed position. The ropes 14 pass over sheaves 16 that are mounted on brackets 17, formed on the pipe section 5.

The brackets 17 also carry rollers 18, which, together with rollers 19 serve to guide a damper frame 20 to which camming bars 21 are secured. The cams 21 are in working contact with the rollers 13, and serve to push valve ring 10 to open position against the tension of the weights 15, thus permitting the damper 8 to be moved in or out of the slot 9.

The cams 21 and the damper frame 20 are operated by gear racks 22, from a hand wheel 23. The damper 8, when in uppermost, or open position is suspended in the damper frame 20 by means of two pins 24 that are secured to the damper frame 20 and project into slotted portions 25 in the damper. The slots are disposed at a slight angle to the plane of the valve seat which is provided with packing 26, the opposite face of the valve disc being engaged by an annular rib 27 on the valve ring 10. The slots provide a cam motion for shifting the damper plate sidewise or axially, withdrawing it from the seat 26, before an upward motion is imparted to it. The slots are of a width somewhat greater than the diameter of the pins 24, to allow the damper 8 to properly adjust itself to the packing 26 and the rib 27 when being seated.

To open the valve, the damper frame 20, with its cam bars 21 is raised. This causes the rollers 13 to be engaged by the upper slopes 28 of the cams 21, thus overcoming the resistance of the counterweights 15 and forcing the valve ring 10 to open position. At this point, the pins 24 of the damper frame 20 have reached the upper ends of the slots in the damper 8 and have forced the damper free of the valve seat 26. During the continued motion of damper frame 20, the damper 8 is lifted out of the pipe. When this has been accomplished, the rollers 13 have reached the slopes 29 of the cams 21 and continued motion of damper frame 20 carries the slopes 29 past the rollers, thus permitting the valve ring 10 to be moved by the counterweights 15 into engagement with the valve seat 26, to close the slot 9. This sequence of motion is accomplished automatically by turning the hand-wheel 23, which will operate worm gearing 30, and gear wheels 31, to lower the racks 22. By turning the hand-wheel 23 in the opposite direction, the sequence of motions is automatically reversed and the valve disc 8 thereby moved to closed position.

The pipe sections 5 and 6 are held in assembled relation and various portions of the valve structure are supported by tie bolts 32 that are suitably secured to the pipe sections. A stop member 33 is mounted on the lower tie bolt 32, for limiting the downward movement of the damper 8. As indicated on the drawing, the gas ordinarily travels in the direction indicated in Fig. 3 by the arrow, so that when the valve 8 is seated, a seal is formed with the seating ring 26 to prevent escape of gas, while when the disc 8 is withdrawn, the rib 27 on the valve ring 10 cooperates with the ring 26 to form a seal against escape of gas through the slot 9, while the packing rings 11 prevent escape of gas between the adjacent faces of the valve ring 10 and the pipe section 6.

I claim as my invention:—

1. Valve structure comprising a valve seat, a valve, a member for yieldably holding the valve against the seat, a lifting member for the valve, a connection between said lifting member and the holding member for shifting the holding member to inoperative position upon commencement of movement of the lifting member, and a lost motion connection between the valve and the lifting member.

2. In a valve structure, the combination with a pipe having a slot, of a valve seat, a valve, a valve-operating member for withdrawing the valve through said slot, a lost motion connection between said member and the valve, permitting them to have limited relative movement radially of the pipe, a yieldably-held valve ring normally holding the valve on its seat and serving to cover the slot when the valve is withdrawn, and a cam surface on said operating member, positioned to force the valve ring to inoperative position during taking up of said lost motion.

3. In a valve structure, the combination with a pipe having a slot, of a valve seat, a valve, a valve-operating member for withdrawing the valve through said slot, a lost motion connection between said member and the valve, permitting them to have limited relative movement radially of the pipe, a yieldably-held valve ring normally holding the valve on its seat and serving to cover the slot when the valve is withdrawn, a cam surface on said operating member, positioned to force the valve ring to inoperative position during taking up of said lost motion, and a cam surface on said member permitting return of the ring to operative position at the completion of the movement of the valve to one of its extreme positions.

4. In a valve structure, the combination with a pipe having a slot, of a valve seat, a valve, a valve-operating member for withdrawing the valve through said slot, a lost motion connection between said member and the valve, permitting them to have limited relative movement radially of the pipe, a yieldably-held valve ring normally holding the valve on its seat and serving to cover the slot when the valve is withdrawn, and a raised surface on said operating member positioned to engage said ring and hold it in retracted position during movement of the operating member through the major portion of its path intermediate the extremities of such path.

5. Valve structure comprising a stationary valve seat, a valve, means for yieldably holding the valve against its seat, a lifting member, means to cause said valve to move axially away from said seat during the initial movement of said lifting member but prior to any radial opening movement of said valve, and connecting means between said lifting member and said valve for effecting radial opening movement of the valve upon continued movement of said lifting member.

In testimony whereof I, the said GUSTAF L. FISK, have hereunto set my hand.

GUSTAF L. FISK.